United States Patent Office 3,023,197
Patented Feb. 27, 1962

---

3,023,197
LIQUID DIENE POLYMER LAMINATING AND CASTING COMPOSITIONS
Charles E. Wheelock, Bartlesville, Okla., assignor to Phillips Petroleum Company, a corporation of Delaware
No Drawing. Filed Feb. 18, 1957, Ser. No. 640,610
11 Claims. (Cl. 260—88.1)

This invention relates to liquid diene polymer laminating and casting compositions. In a further aspect, this invention relates to improved laminates which are formed from mixtures comprising liquid diene polymers and hydroxylated liquid diene polymers. In a further aspect, this invention relates to improved laminating agents comprising liquid diene polymers and a monomeric heterocyclic nitrogen base of the pyridine or quinoline series containing at least one vinyl or alpha-methylvinyl substituent.

The application of resins in the manufacture of castings, laminates, and other articles of commerce is rapidly increasing. New applications for old products are being developed, and new resins having enhanced properties are being placed on the market. The end-use must be considered in order to select a resin composition having the proper physical and chemical properties. Thus, in some cases, resistance to some solvent action may be more important than mechanical strength. The laminates herein disclosed have higher impact, bonding and flexural strength than the laminates produced from liquid polybutadiene. The ability to withstand high temperatures without loss in flexural strength is also noteworthy.

The compositions herein described can also be applied to produce moldings, castings, and coatings with or without admixture with various fillers or mixture of fillers, e.g., wood flour, clay, diatomaceous earths, glass wool, ground glass, cloth, and sand, etc. Impregnation of consolidated or unconsolidated porous objects can be achieved with beneficial results.

The following are objects of this invention.
An object of this invention is to provide new resins suitable for use in casting, laminating, and the like. A further object of this invention is to provide an improved method of preparing laminates of materials such as textiles made of glass fibers. A further object of this invention is to provide an improved resin, said resin comprising a liquid diene polymer and a hydroxylated liquid diene polymer. A further object of this invention is to provide improved resins comprising a liquid diene polymer and a vinyl or alpha-methylvinyl pyridine or quinoline.

Other objects and advantages of this invention will become apparent to one skilled in the art upon reading the accompanying disclosure.

I have discovered that improved laminating resins can be prepared by mixing a liquid polymer of a conjugated diene with a hydroxylated liquid polymer of a conjugated diene or with a compound of the formula

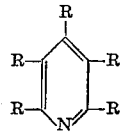 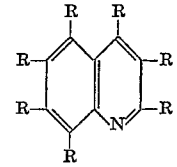

and

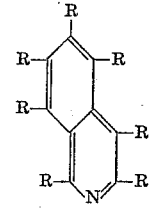

where R is selected from the group consisting of hydrogen, alkyl, vinyl, alpha-methylvinyl, and combinations thereof, at least one R group being vinyl or alpha-methylvinyl. It should be noted that a plurality of vinyl or alpha-methylvinyl groups can be present.

The liquid polymers of conjugated dienes employed base for as the laminating or casting resin in the practice of my invention have molecular weights in the range of about 200 to about 5,000 and a viscosity in the range of 100 to 6,000 Saybolt Furol seconds at 100° F. The liquid polymer can be a homopolymer or copolymer of two or more conjugated dienes containing four to six carbon atoms per molecule. These dienes include 1,3-butadiene, isoprene, piperylene, and 2,3 - dimethyl - 1,3-butadiene. Also suitable are copolymers of these conjugated dienes with a minor portion of one or more monomers copolymerizable therewith and containing the group $CH_2=C<$, such as acrylonitrile, 2-methyl-5-vinylpyridine, styrene, methylstyrene, unsaturated ethers, esters, etc.

The liquid polymers of these conjugated dienes, as described above, can be prepared by mass or emulsion polymerization or by other suitable methods. One convenient method for preparation of liquid polybutadiene is described in U.S. 2,631,175 (1953) to W. W. Crouch, but the practice of this invention is not limited to products prepared by this method.

These same liquid polymers are the starting materials for the production of the hydroxylated liquid polymer used in the resin. The hydroxylation described in U.S. 2,692,892 (1954) to J. C. Hillyer and L. O. Edmonds has been found useful. For example, by this method, polybutadiene is reacted with hydrogen peroxide or a compound capable of yielding hydrogen peroxide, with or without a solvent, in the presence of a catalyst such as formic acid at temperatures in the range of 10 to 95° C. The hydroxylation can proceed nearly to completion. Products having 21.5 percent by weight oxygen have been made. Products with one to about 20 percent oxygen content are generally preferred with 3 to 15 percent a more preferred range. The oxygen can be present as hydroxyl, ester, or epoxy groups. However, it is preferred that at least 30 percent of the oxygen be present as hydroxyl groups. The hydroxylated polymer can be solid or liquid as long as it gives a substantially homogeneous mixture in the liquid diene polymer.

The heterocyclic nitrogen base monomers which are applicable are monomers of the pyridine and quinoline series which contain at least one

substituent where R is either hydrogen or a methyl group. Various alkyl and aryl substituted derivatives of pyridine or quinoline are also applicable, but it is generally preferred that the total number of carbon atoms in the nuclear-substituted alkyl and aryl groups should not be greater than 12 and most preferred of these alkyl groups are methyl and/or ethyl. Examples of such compounds are: 2-vinylpyridine; 4-vinylpyridine; 2,4,6-trimethyl - 5 - vinylpyridine; 3,4,5,6 - tetramethyl - 2 - vinylpyridine; 3 - ethyl - 5 - vinylpyridine; 2 - methyl - 5-vinylpyridine; 2,6 - diethyl - 4 - vinylpyridine; 2 - isopropyl - 4 - nonyl - 5 - vinylpyridine; 2 - vinyl - 5 - ethylpyridine; and 2-methyl-5-undecyl-6-vinylpyridine; similar mono- and di-substituted vinyl and isopropenyl pyridines; and like quinolines.

If an inhibitor is incorporated in these monomers, it is often necessary to remove at least the major portion of the inhibitor prior to use in the molding or laminating composition. Inhibitors such as phenyl-beta-naphthylamine and hydroquinone in amounts generally less than one percent by weight are frequently dissolved in these monomers.

It should be noted that monomers of these heterocyclic nitrogen bases are definitely preferred to polymers prepared from the monomers. For example, laminates prepared with a polymer of 2-methyl-5-vinylpyridine were greatly inferior to laminates prepared with the monomer.

Catalysts can be employed, if desired, to modify the curing process. For example, peroxide-type catalyst (e.g., di-tert-butyl peroxide, tert-butyl hydroperoxide, tert-butyl perbenzoate, and cumene hydroperoxide) in amounts up to 10 parts per 100 parts of the resin composition can be used. The catalyst should preferably be one which does not evolve gases at the curing temperature to avoid the formation of voids. Void formations, however, can be decreased by increase in the pressure applied during the curing or by evacuation prior to and sometimes during the curing process prior to gelation.

The ingredients selected for the molding composition are mixed prior to pouring in the mold. If catalysts are used, they are added preferably just prior to curing to effect maximum benefit and to insure more uniform results. The blended compositions, prior to curing, can cover a wide range of viscosity. Some are quite fluid, others are viscous liquids or nearly pastes.

The reactive components in the thermosetting resin (liquid diene polymer and hydroxylated liquid diene polymer or heterocyclic nitrogen base), exclusive of catalyst, inhibitor, fillers and the like, are composed of about 60 to 95 parts by weight, preferably 70 to 90 parts by weight, of the liquid polymer of the conjugated diene.

The resin is cured at temperatures up to 600° F. and commonly at temperatures in the range of 400 to 500° F. The curing time, while dependent upon the temperature, composition, and other factors, is generally in the range of one to 10 hours. For applications such as impregnation of porous objects which are to be used to fabricate heat resistant objects, the curing can be performed during initial use.

The invention covered is further illustrated by the examples. The method disclosed for fabrication of the laminate is simply illustrative and not necessarily the only method which can be employed in the practice of this invention.

EXAMPLE I

Liquid polybutadiene was prepared from 1,3-butadiene by polymerization in the presence of finely divided sodium as catalyst according to the method of Crouch, 2,631,175. The essentially transparent (Gardner color of about 11) liquid polymer had a viscosity of about 1,400 Saybolt Furol seconds at 100° F.

The liquid polybutadiene prepared by sodium catalyzed polymerization was hydroxylated in a 20-gallon reactor using the following charge.

| Ingredient: | Pounds |
|---|---|
| Polybutadiene | 15 |
| Chloroform | 120 |
| Formic acid | 4.26 |
| Hydrogen peroxide (35 percent) | 9.0 |
| Water | 5.3 |

After reaction for 14 hours at a temperature of 120° F., the polymer was recovered from the reaction mixture and stripped in a vacuum. Analysis of this liquid product gave:

| | |
|---|---|
| Saponification No | 56 |
| Chlorine, weight percent | 1.2 |
| Carbon, weight percent | 81.3 |
| Hydrogen, weight percent | 10.3 |
| Oxygen (by difference) weight percent | 7.2 |

Laminates were prepared from blends of liquid polybutadiene with 2-methyl-5-vinylpyridine or with the aforementioned liquid hydroxylated polybutadiene in the following manner. A puddle of the resin mixture was poured into the bottom of a mold and a cloth of glass fibers was laid on the puddle. Additional resin was put on the cloth and it was stroked with a broad-blade spatula to promote "wetting out" of the cloth and to remove bubbles of air. In like manner, each of the other plies were laid on the pack and the top of the mold was bolted in place. The laminate was then cured at the desired temperature.

The test procedures used were: (a) flexural strength, Federal Specification L–P–406b method 1031; (b) resistance to immersion in water or solvents, Federal Specification L–P–4066 method 7011; (c) Izod impact strength, Federal Specification L–P–4066 method 1071; and (d) bonding strength by Federal Specification L–P–4066 method 111.

Table I shows that laminates prepared with mixtures containing hydroxylated liquid polybutadiene or 2-methyl-5-vinylpyridine and liquid polybutadiene have generally higher impact and bonding strengths than laminates prepared with polybutadiene alone. When the active resin ingredients contain approximately 80 percent polybutadiene, maximum strengths result. It should be noted that the resins prepared according to this invention require shorter cure times than is required for liquid polybutadiene at 500° F. to achieve high strengths, and this is an advantage for their use.

Table II illustrates the improvement in flexural strengths when using 20 percent of 2-methyl-5-vinylpyridine or hydroxylated liquid polybutadiene at optimum cure. It should be noted that the strength of the polybutadiene laminate failed after a six minute exposure at 700° F., whereas the laminates prepared according to this invention retained more than 53 percent of their maximum strength after six minutes exposure at 700° F.

*Table I*

BONDING AND IZOD IMPACT STRENGTHS ON 45 PLY LAMINATES

| Test No. | Liquid polybutadiene, weight percent | 2-methyl-5-vinylpyridine, weight percent | Hydroxylated liquid polybutadiene, weight percent | Hours of cure at 500° F. | Owens Corning finish on cloth [1] | Izod impact strength, ft. lb. per inch of notch | Bonding strength, p.s.i. |
|---|---|---|---|---|---|---|---|
| 1 | 100 | 0 | 0 | 7.5 | 112 | 25 | 873 |
| 2 | 100 | 0 | 0 | 7.5 | 114 | 22 | 1,044 |
| 3 | 100 | 0 | 0 | 11 | 112 | 26 | 1,235 |
| 4 | 100 | 0 | 0 | 11 | 114 | 25 | 1,167 |
| 5 | 85 | 0 | 15 | 5.0 | 114 | 23 | 1,375 |
| 6 | 80 | 0 | 20 | 5.0 | 112 | 30 | 1,804 |
| 7 | 75 | 0 | 25 | 5.0 | 114 | 22 | 1,255 |
| 8 | 80 | 20 | 0 | 5.0 | 114 | 27 | 1,646 |

[1] Finish 112 involves heat treatment to remove organic sizing material. Finish 114 is a water-repellent finish developed particularly for conditions where the fabric is used as a reinforcing media in laminates. Finish 114 includes Finish 112 and involves the application of a chrome-complex water-repellent finish following the heat treatment.

Table II
TESTS WITH 12 PLY LAMINATES

| Test No. | Liquid poly- butadiene, weight percent | 2-methyl-5-vinyl-pyridine, weight percent | Hydroxy-lated polybuta-diene, weight percent | Hours, cure [1] | Flexural strength, p.s.i. | Percent of original strength retained after exposure at 700° F. for | | |
|---|---|---|---|---|---|---|---|---|
| | | | | | | 2 min. | 4 min. | 6 min. |
| 1 | 100 | 0 | 0 | 9 | 35,200 | 82 | 64 | (2) |
| 2 | 80 | 0 | 20 | 7 | [3] 38,400 | 89.8 | 85.2 | 54.7 |
| 3 | 80 | 20 | 0 | 9 | 37,800 | 84.0 | 81.3 | 53.6 |

[1] Hours of cure at 500° F. to give optimum flexural strength.
[2] Destroyed.
[3] On 112 finish cloth. All other tests with 114 finish.

EXAMPLE II

Additional 12 ply laminates were prepared using 80 parts by weight of the liquid polybutadiene and 20 parts by weight of the hydroxylated polymer of Example I. These were cured 5 hours at 260° C. A control prepared without the hydroxylated polymer was cured 6 hours at 260° C. The laminates were immersed in water 48 hours and tested to determine loss in flexural strength. Laminates using the resin containing the hydroxylated polymer retained 81 percent of their original strength which the control retained only 41 percent of the original strength. Cloth with 112 finish was used throughout this example.

As many possible embodiments can be made of this invention without departing from the scope thereof, it is to be understood that all matter herein set forth is to be interpreted as illustrative and not as unduly limiting the invention.

I claim:

1. A new composition of matter, said composition being liquid before cure and comprising (1) 95 to 60 parts by weight of an unhydroxylated liquid polymer of a conjugated diene containing not over six carbon atoms per molecule, said polymer having a molecular weight in the range of about 200 to about 5000 and a viscosity in the range of about 100 to 6000 Saybolt Furol seconds at 100° F.; and (2) 5 to 40 parts by weight of a material selected from the group consisting of (a) a hydroxylated liquid polymer prepared by hydroxylating a polymer of a conjugated diene containing not over six carbon atoms per molecule, said polymer having before hydroxylation a molecular weight in the range of about 200 to 5000 and a viscosity in the range of about 100 to 6000 Saybolt Furol seconds at 100° F., said hydroxylated polymer containing one to 20 weight percent oxygen, at least 30 percent of said oxygen being present as hydroxyl oxygen, and (b) monomeric compounds of formula

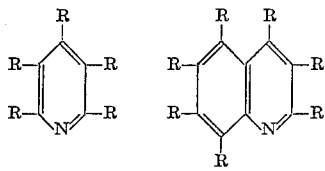

and

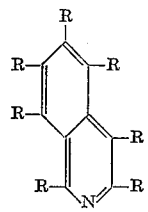

where only one R is selected from each group consisting of vinyl and alpha-methylvinyl and each of the remaining R's is individually selected from the group consisting of hydrogen and alkyl; the amounts of (1) and (2) being selected to give 100 parts by weight, said composition being thermosetting.

2. The composition of claim 1 including, per 100 parts by weight of said composition, up to 10 parts by weight of peroxide curing catalyst.

3. A new composition of matter, said composition being liquid before cure and comprising (1) 95 to 60 parts by weight of an unhydroxylated liquid polymer of a conjugated diene containing not over six carbon atoms per molecule, said polymer having a molecular weight in the range of about 200 to about 5000 and a viscosity in the range of about 100 to 6000 Saybolt Furol seconds at 100° F., and (2) 5 to 40 parts by weight of a hydroxylated liquid polymer prepared by hydroxylating a liquid polymer of a conjugated diene containing not over six carbon atoms per molecule, said polymer having prior to hydroxylation a molecular weight in the range of about 200 to about 5000 and a viscosity in the range of about 100 to 6000 Saybolt Furol seconds at 100° F., said hydroxylated polymer containing one to 20 weight percent oxygen, at least 30 percent of said oxygen being present as hydroxyl oxygen, the amounts of (1) and (2) being selected to give 100 parts by weight, said composition being thermosetting.

4. A new composition of matter, said composition being liquid before cure and comprising (1) 90 to 60 parts by weight of an unhydroxylated liquid polymer of a conjugated diene containing not over six carbon atoms per molecule, and (2) a monomeric compound selected from the group consisting of

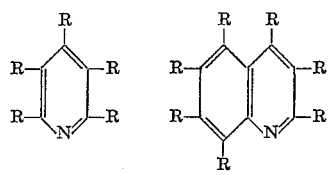

and

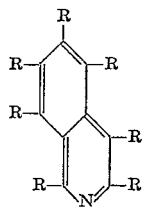

where only one R is selected from the group consisting of vinyl and alpha-methylvinyl and each of the remaining R's is individually selected from the group consisting of hydrogen and alkyl; the amounts of (1) and (2) being selected to give 100 parts by weight said composition being thermosetting.

5. A new composition of matter, said composition being liquid before cure and comprising, (1) 95 to 60 parts by weight of an unhydroxylated liquid polybutadiene having a molecular weight in the range of about 200 to about 5000 and a viscosity of 100 to 6,000 Saybolt Furol seconds at 100° F. and (2) 5 to 40 parts by weight of a material selected from the group consisting of a hydroxylated liquid polybutadiene prepared by hydroxylating polybutadiene having a molecular weight in the range of about 200 to about 5000 and a viscosity in the range of about 100 to 6000 Saybolt Furol seconds at 100° F., said hydroxylated polybutadiene containing 1 to 20 weight percent oxygen, at least 30 percent of said oxygen being present as hydroxyl oxygen, and monomeric 2-methyl-5-vinylpyridine, the amounts of (1) and (2) being selected to give 100 parts by weight, said composition being thermosetting.

6. A new composition of matter, said composition being liquid before cure and comprising (1) 90 to 70 parts by weight of an unhydroxylated liquid polybutadiene having a molecular weight in the range of about 200 to about 5000 and a viscosity of 100 to 6,000 Saybolt Furol seconds at 100° F., and (2) 10 to 30 parts by weight of a material selected from the group consisting of a hydroxylated liquid polybutadiene prepared by hydroxylating polybutadiene having a molecular weight in the range of about 200 to about 5000 and a viscosity in the range of about 100 to 6000 Saybolt Furol seconds at 100° F., said hydroxylated polybutadiene containing 1 to 20 weight percent oxygen, at least 30 percent being present as hydroxyl oxygen, and monomeric 2-methyl-5-vinylpyridine, the amounts of (1) and (2) being selected to give 100 parts by weight, said composition being thermosetting.

7. A new composition of matter, said composition being liquid before cure and comprising (1) 95 to 60 parts by weight of an unhydroxylated liquid polybutadiene having a molecular weight in the range of about 200 to about 5000 and a viscosity of 100 to 6,000 Saybolt Furol seconds at 100° F. and (2) 5 to 40 parts by weight of hydroxylated liquid polybutadiene prepared by hydroxylating polybutadiene having a molecular weight in the range of about 200 to about 5000 and a viscosity in the range of about 100 to 6000 Saybolt Furol seconds at 100° F., said hydroxylated polybutadiene containing 1 to 20 weight percent oxygen, at least 30 percent of said oxygen being present as hydroxyl oxygen, the amounts of (1) and (2) being selected to give 100 parts by weight, said composition being thermosetting.

8. A new composition of matter, said composition being liquid before cure and comprising (1) 95 to 60 parts by weight of an unhydroxylated liquid polybutadiene having a molecular weight in the range of about 200 to about 5000 and a viscosity of 100 to 6,000 Saybolt Furol seconds at 100° F. and (2) 5 to 40 parts by weight of monomeric 2-methyl-5-vinylpyridine, the amounts of (1) and (2) being selected to give 100 parts by weight, said composition being thermosetting.

9. The cured resin prepared by heating the composition of claim 1.

10. The cured resin prepared by heating the composition of claim 7.

11. The cured resin prepared by heating the composition of claim 8.

References Cited in the file of this patent

UNITED STATES PATENTS

| | | |
|---|---|---|
| 2,402,020 | Cislak et al. | June 11, 1946 |
| 2,564,882 | Cubberley et al. | Aug. 21, 1951 |
| 2,640,042 | Howland et al. | May 26, 1953 |
| 2,681,331 | Howland et al. | June 15, 1954 |
| 2,683,124 | D'Alelio | July 6, 1954 |
| 2,688,009 | Crouch et al. | Aug. 31, 1954 |
| 2,692,892 | Hillyer et al. | Oct. 26, 1954 |
| 2,773,795 | Reynolds | Dec. 11, 1956 |
| 2,751,323 | Pritchard et al. | June 19, 1956 |
| 2,830,975 | Irvin | Apr. 15, 1958 |